United States Patent
Dong et al.

(10) Patent No.: US 12,130,452 B2
(45) Date of Patent: Oct. 29, 2024

(54) GRATING ADJUSTING APPARATUS AND 3D DISPLAY APPARATUS

(71) Applicants: HEFEI BOE OPTOELECTRONICS TECHNOLOGY CO., LTD., Anhui (CN); BOE Technology Group Co., Ltd., Beijing (CN)

(72) Inventors: Zhao Dong, Beijing (CN); Ru Zhou, Beijing (CN); Xiaoqing Peng, Beijing (CN); Yun Du, Beijing (CN); Hu Li, Beijing (CN); Donghui Wang, Beijing (CN); Ran An, Beijing (CN); Douqing Zhang, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/283,953

(22) PCT Filed: Jan. 3, 2023

(86) PCT No.: PCT/CN2023/070196
§ 371 (c)(1),
(2) Date: Sep. 25, 2023

(87) PCT Pub. No.: WO2023/142910
PCT Pub. Date: Aug. 3, 2023

(65) Prior Publication Data
US 2024/0160034 A1   May 16, 2024

(30) Foreign Application Priority Data

Jan. 26, 2022 (CN) .......................... 202210093757.4

(51) Int. Cl.
*G02B 30/31* (2020.01)
*G02F 1/1343* (2006.01)
*G02F 1/1345* (2006.01)

(52) U.S. Cl.
CPC ....... *G02B 30/31* (2020.01); *G02F 1/134309* (2013.01); *G02F 1/13452* (2013.01)

(58) Field of Classification Search
CPC ..... G02B 30/26; G02B 30/31; G02F 1/13452; G02F 1/134309
See application file for complete search history.

(56) References Cited

U.S. PATENT DOCUMENTS

2014/0063385 A1* 3/2014 Yang ................ G02F 1/1313
349/1
2014/0126029 A1   5/2014 Fuetterer
(Continued)

FOREIGN PATENT DOCUMENTS

CN   202306062 U   7/2012
CN   102662283 A   9/2012
(Continued)

*Primary Examiner* — Mariam Qureshi
(74) *Attorney, Agent, or Firm* — WHDA, LLP

(57) ABSTRACT

A grating adjustment apparatus includes a first electrode layer, a second electrode layer and a first substrate and a second substrate that are opposite to each other; the grating adjustment apparatus further includes a plurality of first driving lines, a plurality of second driving lines and a plurality of grating units arranged in the first direction, and is configured as: when the grating adjustment apparatus is powered on, the grating unit is capable of forming a light transmission unit and a shading unit, and opening positions and/or opening ratios of the grating unit are adjustable; and the plurality of grating units are divided into at least one group; for the grating units in the same group, at least two of the first sub-electrodes are electrically connected to
(Continued)

different first driving lines, and at least two of the second sub-electrodes are electrically connected to different second driving lines.

17 Claims, 5 Drawing Sheets

(56) References Cited

U.S. PATENT DOCUMENTS

| | | | |
|---|---|---|---|
| 2017/0108701 A1* | 4/2017 | Wu | B29D 11/0073 |
| 2019/0335163 A1 | 10/2019 | Yang et al. | |
| 2019/0353915 A1 | 11/2019 | Zhang et al. | |
| 2020/0183182 A1 | 6/2020 | Yang et al. | |
| 2022/0229335 A1 | 7/2022 | Kroll et al. | |

FOREIGN PATENT DOCUMENTS

| | | | |
|---|---|---|---|
| CN | 102710956 A | | 10/2012 |
| CN | 103048835 A | | 4/2013 |
| CN | 103197474 A | | 7/2013 |
| CN | 103852926 A | | 6/2014 |
| CN | 103995402 A | | 8/2014 |
| CN | 104020625 A | | 9/2014 |
| CN | 206057761 U | | 3/2017 |
| CN | 106918956 A | | 7/2017 |
| CN | 107577092 A | * | 1/2018 |
| CN | 108572489 A | | 9/2018 |
| CN | 108873362 A | | 11/2018 |
| CN | 110095871 A | | 8/2019 |
| CN | 211128026 U | | 7/2020 |
| CN | 114488373 A | | 5/2022 |
| DE | 102012104900 A1 | | 12/2012 |
| EP | 3040759 A1 | | 7/2016 |
| TW | 201107789 A | | 3/2011 |
| WO | 2012/164893 A1 | | 12/2012 |

* cited by examiner

GRATING ADJUSTING APPARATUS AND 3D DISPLAY APPARATUS

The present application claims the priority of the Chinese patent application filed on Jan. 26, 2022 before the China National Intellectual Property Administration with the application number of 202210093757.4 and the title of "GRATING ADJUSTMENT APPARATUS AND 3D DISPLAY APPARATUS", which is incorporated herein in its entirety by reference.

TECHNICAL FIELD

The present application relates to the technical field of display and more particularly, to a grating adjustment apparatus and 3D display apparatus.

BACKGROUND

With the development of technology and technological progress, 3D (three-dimensional) display technology has become a popular research field. Most existing 3D display apparatuses require users to wear 3D glasses to view, which is very troublesome and has a poor user experience. Therefore, a naked eye 3D display apparatus that can achieve 3D display effects without wearing 3D glasses have attracted attention.

SUMMARY

Embodiments of the present application employs the following technical solutions:

In one aspect, a grating adjustment apparatus is provided, which is applied to a 3D display apparatus, and the grating adjustment apparatus includes a first electrode layer, a second electrode layer and a first substrate and a second substrate that are opposite to each other, the first electrode layer is disposed at a side of the first substrate close to the second substrate, and the second electrode layer is disposed at a side of the second substrate close to the first substrate;

the first electrode layer includes a first sub-electrode layer and a second sub-electrode layer that are arranged in stacked, the first sub-electrode layer includes a plurality of first sub-electrodes arranged in a first direction, the second sub-electrode layer includes a plurality of second sub-electrodes arranged in the first direction, orthographic projections of the first sub-electrodes on the first substrate and orthographic projections of the second sub-electrodes on the first substrate are alternately arranged;

the grating adjustment apparatus further includes a plurality of first driving lines, a plurality of second driving lines and a plurality of grating units arranged in the first direction; each of the grating units includes the plurality of first sub-electrodes and the plurality of second sub-electrodes, and is configured as: when the grating adjustment apparatus is powered on, the grating unit is capable of forming a light transmission unit and a shading unit, and opening positions and/or opening ratios of the grating unit are adjustable; and the plurality of grating units are divided into at least one group; for the grating units in the same group, at least two of the first sub-electrodes are electrically connected to different first driving lines, and at least two of the second sub-electrodes are electrically connected to different second driving lines.

Optionally, for the grating units in the same group, the first sub-electrodes are all electrically connected to different first driving lines, and the second sub-electrodes are all electrically connected to different second driving lines.

Optionally, in each of the grating units, the plurality of first sub-electrodes are sorted in the first direction, and the plurality of second sub-electrodes are sorted in the first direction;

for the grating units in the same group, the first sub-electrodes of a same ordinal number are electrically connected to the same first driving line, and the second sub-electrodes of a same ordinal number are electrically connected to the same second driving line.

Optionally, the plurality of grating units are divided into a plurality of groups;

the plurality of first driving lines are divided into a plurality of groups, a quantity of groups of the first driving lines is equal to a quantity of groups of the grating units, the first driving lines in each of the groups are electrically connected to the grating units in different groups, and a quantity of the first driving lines in each of the groups is equal to a quantity of the ordinal numbers of the first sub-electrodes of the grating units in each of the groups; and the plurality of second driving lines are divided into a plurality of groups, a quantity of groups of the second driving lines is equal to the quantity of the groups of grating units, the second driving lines in each of the groups are electrically connected to the grating units in different groups, and a quantity of the second driving lines in each of the groups is equal to a quantity of the ordinal numbers of the second sub-electrodes of the grating units in each of the groups.

Optionally, the grating adjustment apparatus further includes at least one drive unit, and the first driving lines in each of the groups and the second driving lines in each of the groups are electrically connected to the at least one drive unit.

Optionally, the first driving lines in each of the groups are divided into a first portion and a second portion, and the first portion and the second portion are electrically connected to different drive units; and the second driving lines in each of the groups are divided into a third portion and a fourth portion, and the third portion and the fourth portion are electrically connected to different drive units.

Optionally, an orthographic projection of the first portion on the first substrate and an orthographic projection of the second portion on the first substrate are disposed at two opposite sides of an orthographic projection of the first electrode layer on the first substrate; and an orthographic projection of the third portion on the first substrate and an orthographic projection of the fourth portion on the first substrate are disposed at two opposite sides of the orthographic projection of the first electrode layer on the first substrate.

Optionally, the first portion and the second portion are mirrored symmetrically, and the third portion and the fourth portion are mirrored symmetrically.

Optionally, for the grating units in each of the groups, the first sub-electrodes of which the ordinal numbers are odd numbers are electrically connected to the first driving lines of the first portion, and the first sub-electrodes of which the ordinal numbers are even numbers are electrically connected to the first driving lines of the second portion; and for the grating units in each of the groups, the second sub-electrodes of which the ordinal numbers are odd numbers are electrically connected to the second driving lines of the third portion, and the second sub-electrodes of which the ordinal numbers are even numbers are electrically connected to the second driving lines of the fourth portion.

Optionally, the grating adjustment apparatus further includes a grating area, and a non-grating area connected to the grating area; and the first electrode layer and the second electrode layer are disposed in the grating area, and the plurality of first driving lines and the plurality of second driving lines are disposed in the non-grating area.

Optionally, one end of each of the first sub-electrodes extends to the non-grating area and is connected to the corresponding first driving line; and one end of each of the second sub-electrodes extends to the non-grating area and is connected to the corresponding second driving line.

Optionally, in each of the grating units, the plurality of first sub-electrodes are sorted in the first direction, the plurality of second sub-electrodes are sorted in the first direction, and each of the first sub-electrodes and each of the second sub-electrodes include a first end and a second end that are opposite to each other, respectively;

in each of the grating units, the first end of each of the first sub-electrodes and the second sub-electrodes of which the ordinal numbers are odd numbers extends to the non-grating area, and the second end of each of the first sub-electrodes and the second sub-electrodes of which the ordinal numbers are even numbers extends to the non-grating area.

Optionally, materials of the first sub-electrodes and the second sub-electrodes include transparent conducting materials.

Optionally, the first sub-electrodes and the second sub-electrodes include a strip electrode.

In another aspect, a 3D display apparatus is provided, and the 3D display apparatus includes a display panel and a grating adjustment apparatus according to any one of claims 1-14, and the grating adjustment apparatus and the display panel are disposed oppositely.

Optionally, the display panel includes a touch display panel, and the grating adjustment apparatus is disposed at a backlight side of the display panel.

Optionally, the grating adjustment apparatus includes a grating area and a non-grating area connected to the grating area, the display panel includes an active area and a non-active area connected to the active area; and the active area covers the grating area, and the non-active area covers the non-grating area.

Optionally, the grating adjustment apparatus includes a first substrate and a second substrate that are opposite to each other, the display panel includes a third substrate and a fourth substrate that are opposite to each other, and the second substrate is adhered to the third substrate.

Optionally, the 3D display apparatus further includes a shooting unit, the grating adjustment apparatus is electrically connected to the shooting unit, and is configured to adjust opening positions and/or opening ratios of the grating units of the grating adjustment apparatus according to shooting information of the shooting unit.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present application or the related art, the figures that are required to describe the embodiments or the related art will be briefly described below. Apparently, the figures that are described below are embodiments of the present application, and a person skilled in the art can obtain other figures according to these figures without paying creative work.

DETAILED DESCRIPTION

The technical solutions according to the embodiments of the present application will be clearly and completely described below with reference to the drawings according to the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In the embodiments of the present application, the use of words such as "first", "second", "third", and "fourth" to distinguish identical or similar items with essentially the same function and effect is only for the purpose of clearly describing the technical solution of the embodiment of the present application, and cannot be understood as indicating or implying relative importance or implying the quantity of indicated technical features.

In the embodiments of the present application, "multiple" means two or more, and "at least one" means one or more, unless otherwise specified.

In the embodiments of the present application, the tel is "up", "down", etc. indicate the orientation or positional relationship based on the orientation or positional relationship shown in the accompanying drawings, only for the convenience of describing the present application and simplifying the description, rather than indicating or implying that the device or component referred to must have a specific orientation, be constructed and operated in a specific orientation, and therefore cannot be understood as a limitation on the present application.

Figure 1:
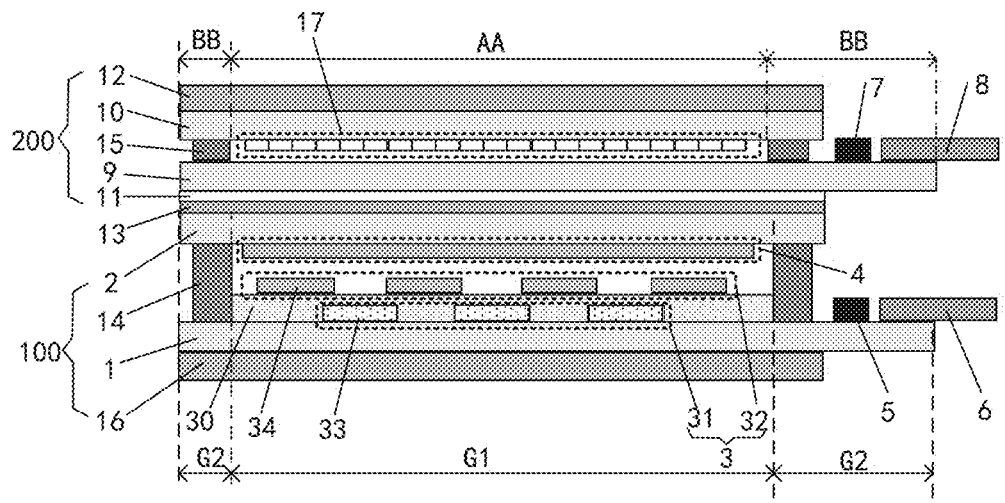
FIG. 1 is a schematic structural diagram of a 3D display apparatus according to an embodiment of the present application.

The embodiment of the present application provides a grating adjustment apparatus, applied to a 3D display apparatus. Referring to FIG. 1, the grating adjustment apparatus 100 includes a first electrode layer 3, a second electrode layer 4 and a first substrate 1 and a second substrate 2 that are opposite to each other, the first electrode layer 3 is disposed at a side of the first substrate 1 close to the second substrate 2, and the second electrode layer 4 is disposed at a side of the second substrate 2 close to the first substrate 1.

Figure 2A:
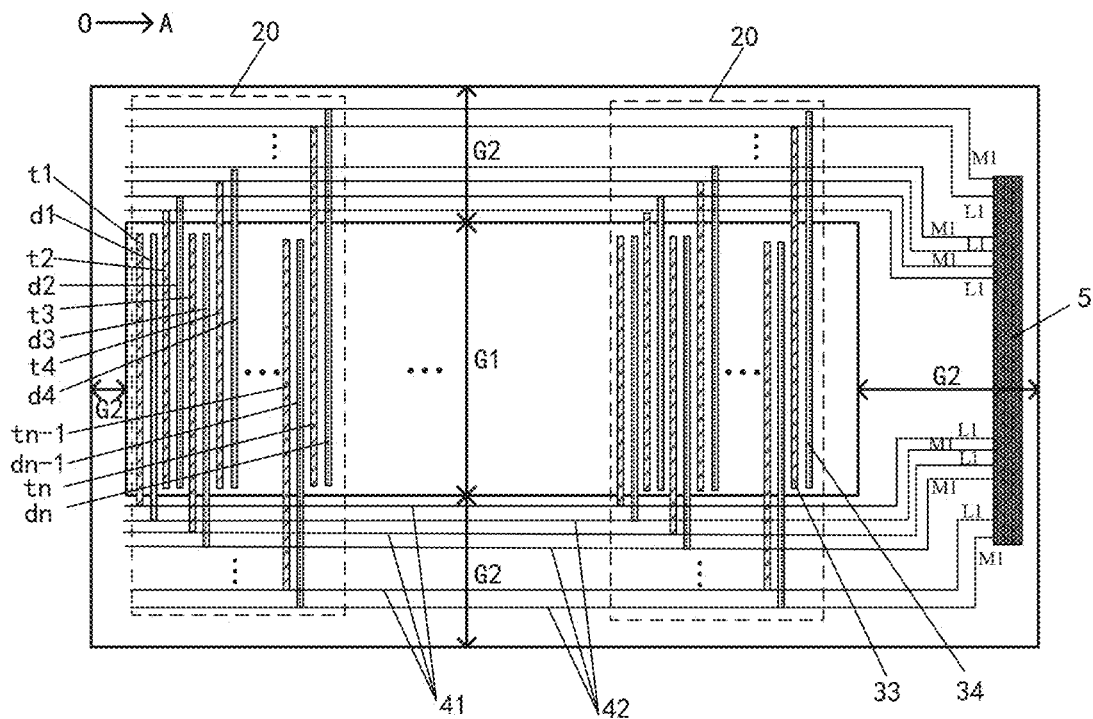
FIG. 2a and FIG. 2b are schematic structural diagrams of two types of grating adjustment apparatuses according to embodiments of the present application.

Referring to FIG. 1, the first electrode layer 3 includes a first sub-electrode layer 31 and a second sub-electrode layer 32 that are arranged in stacked. Referring to FIG. 1 and FIG. 2a, the first sub-electrode layer 31 includes a plurality of first sub-electrodes 33 arranged in a first direction, the second sub-electrode layer 32 includes a plurality of second sub-electrodes 34 arranged in the first direction (the OA direction in FIG. 2a), orthographic projections of the first sub-electrodes 33 on the first substrate 1 and orthographic projections of the second sub-electrodes 34 on the first substrate 1 are alternately arranged.

Referring to FIG. 2a, the grating adjustment apparatus further includes a plurality of first driving lines 41, a plurality of second driving lines 42 and a plurality of grating units 20 arranged in the first direction (the OA direction). Each of the grating units 20 includes the plurality of first sub-electrodes 33 and the plurality of second sub-electrodes 34, and is configured as: when the grating adjustment apparatus is powered on, referring to FIG. 3, the grating unit is capable of forming a light transmission unit 21 and a shading unit 22, and opening positions and/or opening ratios of the grating unit are adjustable.

The plurality of grating units are divided into at least one group; for the grating units in the same group, at least two of the first sub-electrodes are electrically connected to different first driving lines, and at least two of the second sub-electrodes are electrically connected to different second driving lines.

The above grating adjustment apparatus may include a liquid crystal grating adjustment apparatus, which may be a Twisted Nematic (TN) type liquid crystal grating adjustment apparatus. The grating adjustment apparatus may also include a liquid crystal layer, which is set between the first electrode layer and the second electrode layer. Certainly, it may also include other film layers, which will not be repeated here.

The second electrode layer may include a third sub-electrode arranged on an entire surface as shown in FIG. 1. When powered on, the first sub-electrodes and the second sub-electrodes form an electric field with the third sub-electrode, respectively, thereby changing the twisting situation of the liquid crystal molecules in the liquid crystal layer between the first electrode layer and the second electrode layer, and changing the amount of light emitted after passing through the grating adjustment apparatus, thus forming the light transmission unit and the shading unit.

In the first electrode layer, the first sub-electrode layer 31 may be disposed at a side of the second sub-electrode layer 32 close to the first substrate 1 as shown in FIG. 1, or the first sub-electrode layer may be disposed at a side of the second sub-electrode layer away from the first substrate, which is not be limited here.

Figure 4:
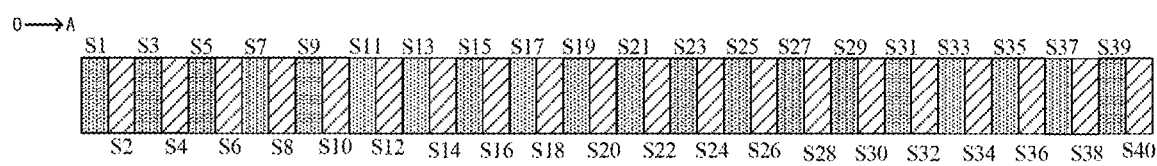
FIG. 4 and FIG. 5 are schematic structural diagrams of two types of first sub-electrodes and second sub-electrodes according to embodiments of the present application.
Figure 5:
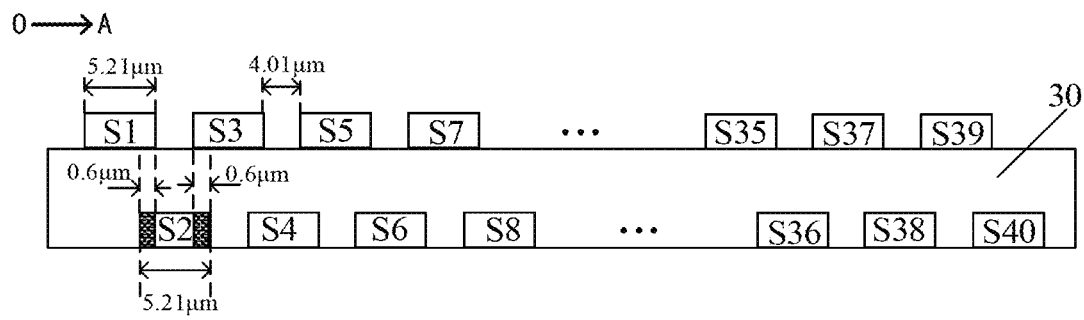

There are no restrictions on widths of the first sub-electrodes in the first direction and widths of the second sub-electrodes in the first direction, and which may be selected based on a size of the display panel. For example, the grating adjustment apparatus is applied in a 3D display apparatus of 10.95 inch, and the grating unit may be shown in FIG. 4, including 20 first sub-electrodes (marked as S2, S4, S6 . . . S40 in FIG. 1, respectively) and 20 second sub-electrodes (marked as S1, S3, S5 . . . S39 in FIG. 1, respectively). Referring to FIG. 5, the widths of the first sub-electrodes and the second sub-electrodes in the first direction may be 5.21 μm, respectively. A space between adjacent first sub-electrodes in the first direction may be 4.01 μm. The widths, in the first direction, of the portions where the boundaries on both sides of the first sub-electrode respectively overlap with the second sub-electrode in a direction perpendicular to the first substrate is 0.6 μm.

The orthographic projections of the first sub-electrodes on the first substrate and the orthographic projections of the second sub-electrodes on the first substrate may be arranged alternately. The orthographic projections of the first sub-electrodes on the first substrate and the orthographic projections of the second sub-electrodes on the first substrate may partially overlap or may not overlap, and there is no restriction here. Due to limitations in related processes, there is a partial overlap between the boundary of the first sub-electrodes and the boundary of the second sub-electrodes in the direction perpendicular to the first substrate. Therefore, the orthographic projections of the first sub-electrodes on the first substrate and the orthographic projections of the second sub-electrodes on the first substrate partially overlap.

Taking the first sub-electrode layer disposed at the side of the second sub-electrode layer close to the first substrate as shown in FIG. 1 as an example, the portion of the first sub-electrode that overlaps with the second sub-electrode in the direction perpendicular to the first substrate (such as the black portion of the first sub-electrode marked as S2 in FIG. 5) is an invalid electrode and is shielded by the second sub-electrode, which has no effect on the liquid crystal. The portion of the first sub-electrode that does not overlap with the second sub-electrode in the direction perpendicular to the first substrate is an active electrode, which can control the rotation of the liquid crystal. Compared to the first sub-electrode, the second sub-electrode is closer to the liquid crystal layer and is not affected by the first sub-electrode. Therefore, all of the second sub-electrodes are the active electrodes, which can control the rotation of the liquid crystal. In FIG. 5, in order to avoid mutual influence between the first sub-electrode and the second sub-electrode, the grating adjustment apparatus may also include an insulation layer 30.

Certainly, if the first sub-electrode layer is disposed at the side of the second sub-electrode layer away from the first substrate, at this point, the first sub-electrodes are closer to the liquid crystal layer than the second sub-electrodes, and all of the first sub-electrodes are the active electrodes, which can control the rotation of the liquid crystal. The part of the second sub-electrode that overlaps with the first sub-electrode in the direction perpendicular to the first substrate is an invalid electrode, which is shielded by the first sub-electrode and has no effect on the liquid crystal. The part of the second sub-electrodes that does not overlap with the first sub-electrodes in the direction perpendicular to the first substrate is the active electrode, which can control the rotation of the liquid crystal.

The shapes of the first sub-electrodes and the second sub-electrodes are not limited. For example, the shapes of the first sub-electrodes and the second sub-electrodes may include strips as shown in FIG. 2a, and the shapes of cross-sections may include rectangles, squares, trapezoids, or inverted trapezoids, etc. FIG. 1 and FIG. 5 take the cross-sections of the first sub-electrodes and the second sub-electrodes being rectangles as an example to illustrate.

Figure 3:
FIG. 3 is a schematic structural diagram of a grating unit according to an embodiment of the present application.

When the grating adjustment apparatus is powered on, as shown in FIG. 3, the above-mentioned grating unit 20 can form a light transmission unit 21 and a shading unit 22. The light transmission unit can transmit light (which is equivalent to the opening of the grating unit), while the shading unit cannot transmit light. The plurality of grating units cooperate to form a grating with a plurality of openings. The opening ratio of the grating unit is an area of the light transmission unit/(the area of the light transmission unit+an area of the shading unit).

The above grating adjustment apparatus is applied to a 3D display apparatus, as shown in FIG. 1. The 3D display apparatus includes a display panel 200 and a grating adjustment apparatus 100, which is disposed opposite to the display panel 200. The grating adjustment apparatus may be disposed on a light-emitting side of the display panel, and at this point, the grating adjustment apparatus may be referred to as the front grating. Alternatively, as shown in FIG. 1, the grating adjustment apparatus 100 may be disposed on a backlight side of the display panel 200, and at this point, the grating adjustment apparatus may be referred to as a rear grating, and there is no limitation here.

Figure 6:
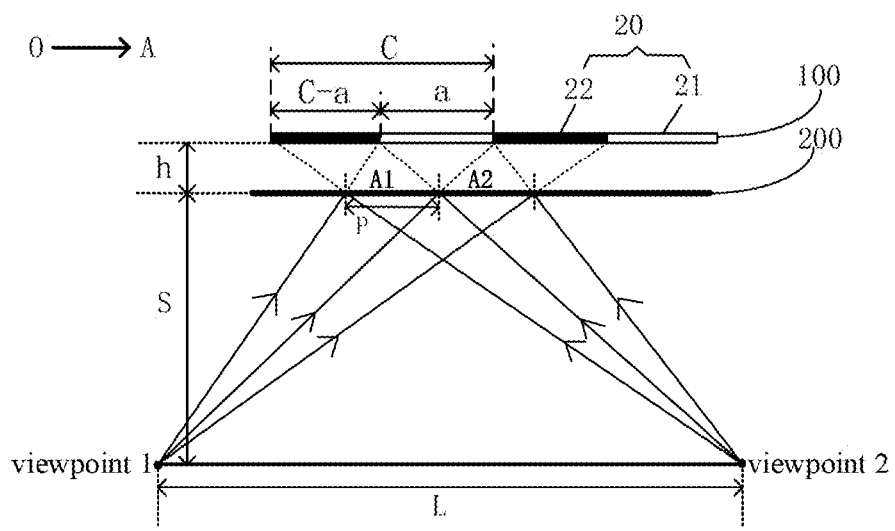
FIG. 6 is a schematic diagram of implementing a 3D display according to an embodiment of the present application.

The following is an example of disposing the grating adjustment apparatus on the backlight side of the display panel to illustrate the principle of achieving 3D display. As shown in FIG. 6, positions of a left eye and a right eye of a user are marked as viewpoint 1 and viewpoint 2 (i.e., a number of viewpoints n is 2), a distance between the two eyes is a pupillary distance L, a viewing distance (i.e., a distance between the eyes and the display panel) is marked as S, a distance between the display panel 200 and the grating adjustment apparatus 100 is a placement height h, and a width of a single pixel unit in the display panel 200 along the first direction (OA direction) is P, a width of the grating unit 20 in the grating adjustment apparatus 100 along the first direction (OA direction) is C (also known as Pitch C). Among them, a width of the light transmission unit 21 in the first direction (OA direction) is a, and a width of the shading unit 22 in the first direction (OA direction) is C-a. It should be noted that the display panel includes a plurality of pixel units arranged in an array, which may include a plurality of sub-pixels, such as red (R) sub-pixels, green (G) sub-pixels, or blue (B) sub-pixels.

In FIG. 6, by controlling opening sizes and opening positions of the grating unit, when the user views the first active area A1 of the display panel at the viewpoint 1, it corresponds to the light transmission unit 21. However, when the user views the first active area A1 of the display panel at the viewpoint 2, it corresponds to the shading unit 22. That is, at the same observation time, the user can see the first active area A1 at the viewpoint 1, while the user cannot see the first active area A1 at the viewpoint 2. Similarly, by controlling the opening sizes and the opening positions of the grating unit, the user can see the second active area A2 at the viewpoint 2 at the same observation time, while the user cannot see the second active area A2 at the viewpoint 1. In this way; the image of the first active area A1 seen at the viewpoint 1 and the image of the second active area A2 seen at the viewpoint 2 can generate a parallax, thus forming stereo vision and achieving 3D display.

As shown in FIG. 6, based on the geometric relationship of the triangle, it can be obtained that:

$$h/(h+S)=P/L. \tag{1}$$

$$C/nP=(S+h)/S \tag{2}$$

$$a/P=(S+h)/S \tag{3}$$

By using formulas (1), (2), and (3), we can obtain a formular (4): $C=nPL/(L-P)$, a formular (5): $h=SP/(L-P)$, and a formular (6): $a/C=1/n$, and the number of the viewpoints n may be taken as 2. The width C and the placement height h of the grating unit in the grating adjustment apparatus along the first direction may be determined by referring to the formulas (4) and (5), respectively. In the formula (6), when the number of the viewpoints n is taken as 2, the width of the light transmission unit along the first direction in the grating unit is the same as the width of the shading unit along the first direction.

There are various situations that can cause crosstalk in the actual use of the 3D display apparatus.

Figure 7:
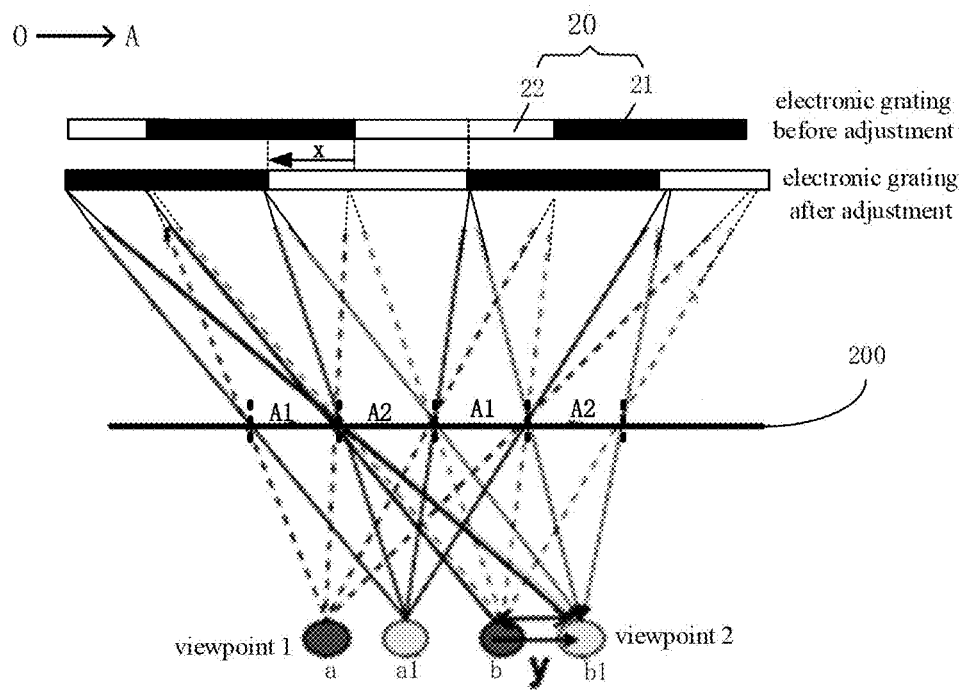
FIG. 7 is a schematic diagram of avoiding crosstalk after the viewpoint is horizontally shifted to the right according to an embodiment of the present application.

The first type is the crosstalk caused by the user moving left and right in a horizontal direction when the viewing distance is constant. As shown in FIG. 7, taking the viewpoint moving to the right in the first direction (OA direction) as an example, the viewpoint 1 moves from a position a to a position a1, and the viewpoint 2 moves from a position b to a position b1. If the widths of the shading unit and the light transmission unit of the grating unit along the first direction remains unchanged, that is, the structure of the grating adjustment apparatus is still the structure before adjustment. Taking the viewpoint 1 at the position a and the position a1 as examples, respectively, when the viewpoint 1 is at the position a and the first active area A1 of the display panel is viewed, it corresponds to the shading unit, then the first active area cannot be seen when the viewpoint 1 is at the position a. When the viewpoint 1 is at the position a1 and the first active area A1 of the display panel is viewed, it corresponds to a portion of the shading unit and a portion of the light transmission unit. Therefore, the first active area can be seen when the viewpoint 1 is at the position a1. When the viewpoint 1 moves from the position a to the position a1, the active area which the user can view changes, resulting in crosstalk and causing adverse experiences such as nausea and dizziness for users. In FIG. 7, in order to better compare the structures of the grating adjustment apparatus before adjustment and after adjustment, the two are plotted separately.

In order to solve the problem, the opening positions of the grating unit in the grating adjustment apparatus can be controlled based on the movement of the viewpoint, thus matching the viewpoint after moving. In the present application, for the grating units in the same group, at least two first sub-electrodes are electrically connected to different first driving lines, and at least two second sub-electrodes are electrically connected to different second driving lines. So, the voltages of the corresponding first sub-electrodes and second sub-electrodes can be controlled through the plurality of first driving lines and the plurality of second driving lines, so that part or all of the light transmission unit can be converted into the shading unit, and part or all of the shading unit can be converted into the light transmission unit, to achieve changes in the opening positions of the grating unit.

As shown in FIG. 7, taking the viewpoint 1 as an example to illustrate, when the viewpoint 1 moves from the position a to the position a1 (moving to the right along the first direction), by controlling the first driving lines and the second driving lines, the positions of the shading unit and the light transmission unit of the grating unit can be changed (the grating adjustment apparatus shifts to the left in the overall effect). The adjusted grating unit is shown in FIG. 7, after adjustment, the user cannot see the first active area when the viewpoint 1 is at the position a1, thus ensuring consistent viewing effect as much as possible after the viewpoint moves and reducing crosstalk.

Referring to FIG. 7, based on the geometric relationship of the triangle, if the moving distance of the viewpoint 1 is y and the left moving distance of the grating adjustment apparatus is x, then x/y=h/S, h is the placement height, and S is the viewing distance. Taking the 3D display apparatus of 10.95 inch as an example, the distribution of first sub-electrodes and the second sub-electrodes is shown in FIG. 4. The widths of the first sub-electrodes and the second sub-electrodes along the first direction can be 4.6 μm, respectively. Each grating unit includes 20 first sub-electrodes and 20 second sub-electrodes, with a pixel width of P=92.13 μm. If the pupillary distance L=65 mm and the observation distance S=450 mm, then the grating adjustment apparatus Pitch C=184.52 μm. When moving horizontally between left and right, the theoretical maximum crosstalk is about 5%, which meets the expected value.

The present application can control the voltages of the corresponding first sub-electrodes and second sub-electrodes through the plurality of first driving lines and the plurality of second driving lines, so that part or all of the light transmission unit can be converted into the shading unit, and part or all of the shading unit can be converted into the light transmission unit, thereby achieving changes in the opening positions of the grating unit. Furthermore, it reduces the crosstalk caused by users moving horizontally between left and right while maintaining the same viewing distance.

Figure 8:
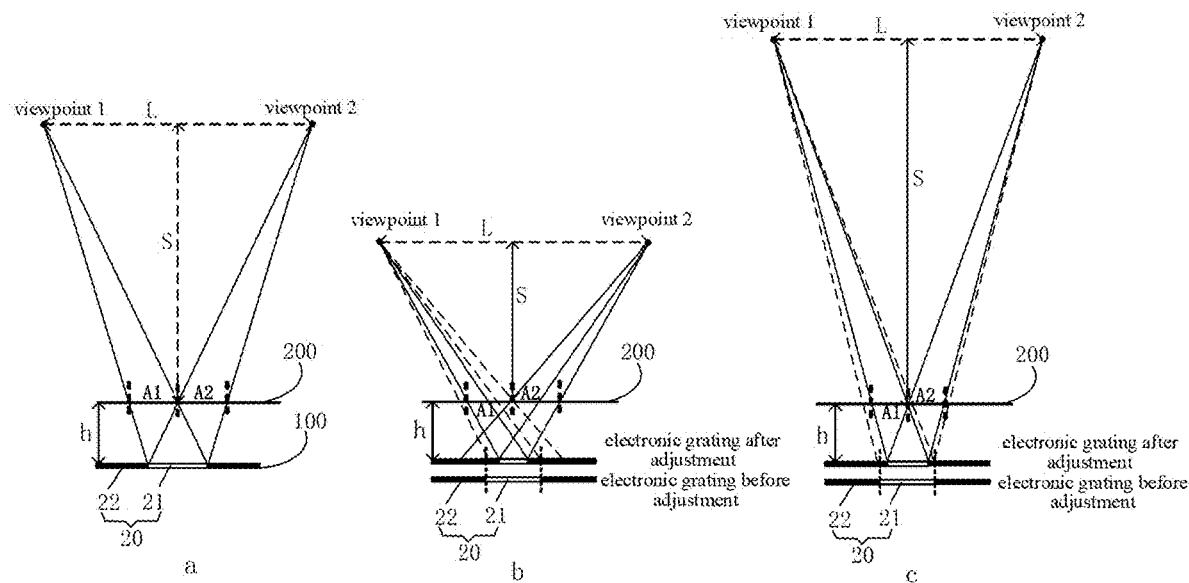
In FIG. 8, plan a is a schematic diagram without crosstalk, plan b is a schematic diagram after a viewing distance is reduced, and plan c is a schematic diagram after the viewing distance is increased.

The second type is the crosstalk caused by changes in the viewing distance. As shown in FIG. 8, plan a is a diagram of a sight line with the best viewing distance. In this case, there is no crosstalk, where the viewpoint 1 (left eye) can see the first active area A1 and the right eye can see the second active area. A2. Plan b shows a diagram of a sight line when the viewing distance becomes smaller. If the structure of the grating adjustment apparatus remains unchanged after the viewing distance becomes smaller, the viewpoint 1 (left eye) can see the first active area A1 and part of other active areas on the left side of the first active area A1, while the viewpoint 2 (right eye) can see the second active area A2 and part of other active areas on the right side of the second active area A2, thus forming crosstalk. Plan c shows a diagram of a sight line when the viewing distance becomes larger. After the viewing distance becomes larger, if the structure of the grating adjustment apparatus remains unchanged, the viewpoint 1 (left eye) can see all of the first active area A1, part of other active areas at the left side of the first active area A1, and part of the second active area A2, the viewpoint 2 (right eye) can see all of the second active area A2, part of other active areas at the right side of the second active area A2, and part of the first active area A1, thus forming the crosstalk. When the viewing distance changes (including becoming larger or smaller), the active area that can be viewed changes, leading to crosstalk and causing adverse experiences such as nausea and dizziness for users.

In order to solve the problem, the opening ratio of the grating unit in the grating adjustment apparatus can be controlled based on the movement of the viewpoint, thus matching the viewpoint after moving. In the present application, for the grating unit in the same group, at least two first sub-electrodes are electrically connected to different first driving lines, and at least two second sub-electrodes are electrically connected to different second driving lines. So, the voltages of the corresponding first sub-electrodes and second sub-electrodes can be controlled through the plurality of first driving lines and the plurality of second driving lines, so that a part of the light transmission units can be converted into the shading units, thereby increasing the area of the shading unit and reducing the opening ratio of the grating unit. Referring to FIG. 8, the part of the light transmission units are converted into the shading units, and the openings of the adjusted grating unit becomes smaller. After adjustment, the viewpoint 1 can only see the first active area, while the viewpoint 2 can only see the second active area, thus ensuring consistent viewing effect as much as possible after the viewpoints move, and reducing the crosstalk.

The opening ratio of the adjusted grating unit is equal to $0.5*(1-h*(L-P)*|1/ S-1/ S'|/P)$, where S is the optimal viewing distance before moving far and near, and S' is the viewing distance after moving far and near. At the same time, from the formula of the opening ratio, it can be inferred that the viewing distance corresponding to the maximum opening ratio is the optimal viewing distance corresponding to the changed opening ratio. Meanwhile, based on the geometric relationship of the triangle, it can be inferred that the theoretical width of the grating unit along the first direction in the grating adjustment apparatus is equal to $2P(1+h/S)$ when moving far and near.

The present application can convert a part of the light transmission units into the shading units by controlling the plurality of first driving lines and the plurality of second driving lines, thereby achieving changes in the opening ratio of the grating unit and reducing crosstalk caused by a user moving far and near.

The third type is the crosstalk caused by the combination of viewing distance changes and horizontal left and right movement, which means both the first situation and the second situation occur simultaneously. In this case, the voltages of the corresponding first sub-electrodes and second sub-electrodes can be controlled through the plurality of first driving lines and the plurality of second driving lines, thereby controlling the sizes and positions of the light transmission units and the shading units of the grating unit, and controlling the opening positions and the opening ratio of the grating unit. Which can ensure consistent viewing effect after the viewpoint is moved as much as possible, thus reducing the crosstalk caused by horizontal left and right movement and far and near movement of the users. For specific situations, please refer to the explanations of the first type and the second type mentioned above, and which will not be repeated here.

In one or more embodiments, for the grating units in the same group, the first sub-electrodes are all electrically connected to different first driving lines, and the second sub-electrodes are all electrically connected to different second driving lines. In this way, for the grating units in the same group, each of the first sub-electrodes is controlled by different first driving lines, and each of the second sub-electrodes is controlled by different second driving lines, which can finely and accurately control the voltages of each first sub-electrode and each second sub-electrode in the grating units of the same group. Furthermore, the sizes and the positions of the shading units and the light transmission units of the grating unit can be adjusted more accurately, thereby further reducing the crosstalk problem caused by the viewpoint movement.

Optionally, in order to reduce the difficulty of control and facilitate implementation, referring to FIG. 2a, in the grating unit, the plurality of first sub-electrodes 33 are sorted in the first direction OA direction (the first sub-electrodes with the ordinal numbers 1, 2, 3 . . . n in FIG. 2a are marked as t1, t2, t3 . . . tn, respectively), and the plurality of second sub-electrodes 34 are sorted in the first direction OA direction (the second sub-electrodes with the ordinal numbers 1, 2, 3 . . . n in FIG. 2a are marked as d1, d2, d3 . . . dn).

Figure 2B:
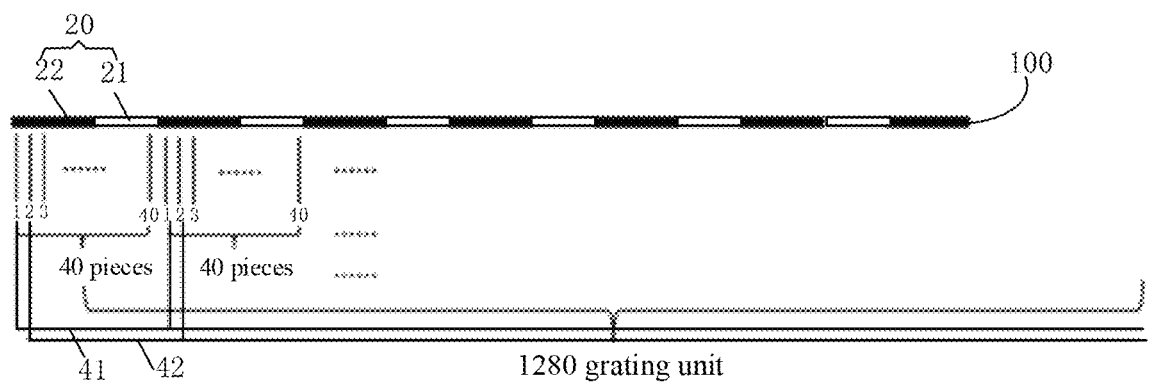

For the grating units in the same group, referring to FIG. 2b, the first sub-electrodes of the same ordinal number are electrically connected to the same first driving line 41, and the second sub-electrodes of a same ordinal number are electrically connected to the same second driving line 42. In this way, one first driving line can simultaneously control multiple first sub-electrodes with the same ordinal number, and one second driving line can simultaneously control multiple second sub-electrodes with the same ordinal number, which can reduce control difficulty and the number of the driving lines, and which is beneficial for saving space and reducing costs. FIG. 2b takes the grating adjustment apparatus applied to a 3D display apparatus of 10.95 inch as an example to illustrate. The grating adjustment apparatus may include 1280 grating units, and each of the grating units includes 20 first sub-electrodes and 20 second sub-electrodes. The ordinal numbers of the first sub-electrodes and the second sub-electrodes alternately arranged are 1, 2, 3 . . . , 40, respectively. In each of the grating units, the first sub-electrodes with the same ordinal number (such as the first sub-electrodes with the ordinal number being 1 in FIG. 2b) is electrically connected to the same first driving line 41, and the second sub-electrodes with the same ordinal number (such as the second sub-electrodes with the ordinal number being 2 in FIG. 2b) is electrically connected to the same second driving line 42.

FIG. 2a and FIG. 2b are illustrated using the example of the grating adjustment apparatus including a group of grating units. As shown in FIG. 2a, the first sub-electrode marked as t1 in the first grating unit on the left and the first sub-electrode marked as t1 in the first grating unit on the right are electrically connected to the first driving line marked as L1. The second sub-electrode marked as d1 in the first grating unit on the left and the second sub-electrode marked as d1 in the first grating unit on the right are electrically connected to the second driving line marked as M1. The situations of the first sub-electrodes and the second sub-electrodes with other ordinal ntunbers can be referred to above, and which will not be listed here.

In the present application, the plurality of grating units can be divided into one group or a plurality of groups, and there are no restrictions here. When the plurality of grating units are divided into one group, when adjusting the distance far and near, combined with the above instructions, and when the placement height h of the grating adjustment apparatus and the pixel width P of the display panel determined, the opening ratio of the grating unit, the theoretical width of the grating unit, the design width deviation, and the proportion of areas with crosstalk≤10% can be obtained with different viewing distances. The specific situation is shown in Table 1.

TABLE 1

| | viewing distance/mm | | | | | | | | |
|---|---|---|---|---|---|---|---|---|---|
| | 300 | 350 | 400 | 450 | 500 | 550 | 600 | 650 | 700 |
| opening ratio of grating unit | 0.25 | 0.36 | 0.44 | 0.50 | 0.45 | 0.41 | 0.38 | 0.35 | 0.32 |
| theoretical width of grating unit Pitch/μm | 184.65 | 184.60 | 184.55 | 184.52 | 184.50 | 184.47 | 184.46 | 184.44 | 184.43 |
| design width deviation | 0.13 | 0.08 | 0.03 | 0.00 | −0.02 | −0.05 | −0.06 | −0.08 | −0.09 |
| maximum offset | 169.35 | 97.62 | 43.81 | 0.00 | −31.51 | −58.90 | −81.72 | −101.04 | −117.59 |
| Centered on a leftmost side of a screen, areas with crosstalk ≤ 10% | 5.44% | 9.44% | 21.03% | 100.00% | 29.24% | 15.64% | 11.27% | 9.12% | 7.83% |

Figure 9:
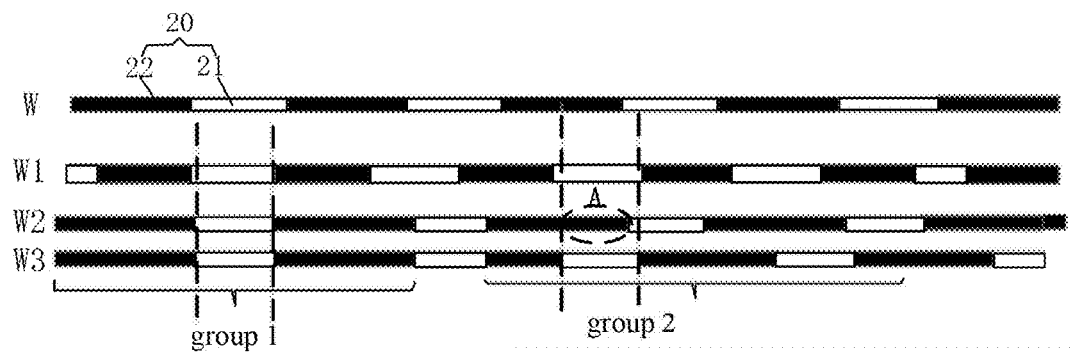
FIG. 9 is a schematic diagram of a grouping adjustment of a grating unit according to an embodiment of the present application.

In Table 1, the corresponding structure has no crosstalk when the viewing distance is 450 mm. From Table 1, it can be seen that with the viewing distance of 450 mm and a distance offset of 50 mm, only about 20% of the area with crosstalk≤10% remains, and the distance adjustment needs to be further improved. Because deviation accumulation may occur when the plurality of grating units are divided into one group and the grating units are adjusted simultaneously, the deviations cannot be further reduced. For example, referring to FIG. 9, the initial structures of the plurality of grating units W are shown in FIG. 9. After moving far and near, the opening ratio of the grating unit WI corresponding to the moved viewing distance decreases. The plurality of grating units are divided into one group for overall adjustment, so that the initial grating unit W is converted into the adjusted grating unit W2, and the opening ratio of the adjusted grating unit is reduced. Due to a fixed period of adjustment, after the deviation accumulation, there may be deviations in positions such as an area A.

Based on this, in order to further reduce the crosstalk generated during far and near movement, referring to FIG. 9, the plurality of grating units are divided into the plurality of groups for grouping adjustment. The adjustments between groups do not affect each other. For example, the structure of the grouping adjusted grating unit W3 is shown in FIG. 9. In FIG. 9, group 1 converts the initial grating unit W into a grating unit with a small opening ratio, and group 2 further adjusts the grating units with accumulated deviations. For example, a shading unit can be converted into a light transmission unit, similar to the aforementioned translation (left or right) method, to significantly reduce the crosstalk caused by the accumulated deviations, and thus significantly reducing the crosstalk problem caused by far and near movement. At the same time, there will be no problem of sharp brightness decrease due to adjusting the opening ratio.

Using the same design parameters as Table 1, the difference is that the plurality of grating units are divided into 16 groups and controlled separately. Among the grating units in each group, the widths of the first sub-electrodes and the second sub-electrodes are 5.21 µm. The spacing between adjacent first sub-electrodes is 4.01 µm. Based on the above explanation, Table 2 can be obtained through calculation.

TABLE 2

| | viewing distance/mm | | | | | | | | |
|---|---|---|---|---|---|---|---|---|---|
| | 300 | 350 | 400 | 450 | 500 | 550 | 600 | 650 | 700 |
| opening ratio of grating unit | 0.25 | 0.36 | 0.44 | 0.50 | 0.45 | 0.41 | 0.38 | 0.35 | 0.32 |
| theoretical width of grating unit Pitch/µm | 184.65 | 184.60 | 184.55 | 184.52 | 184.50 | 184.47 | 184.46 | 184.44 | 184.43 |
| design width deviation | 0.13 | 0.08 | 0.03 | 0.00 | −0.02 | −0.05 | −0.06 | −0.08 | −0.09 |
| minimum period corresponding to a width of the grating unit | 70 | 121 | 269 | — | 375 | 200 | 144 | 117 | 100 |
| maximum crosstalk | 0~5.2% | 0~3.6% | 0~2.9% | — | 0~2.9% | 0~3.1% | 0~3.4% | 0~3.7% | 0~4.0% |

In Table 2, the corresponding structure has no crosstalk when the viewing distance is 450 mm. From Table 2, it can be seen that when the viewing distance of 400 mm-600 mm, the maximum crosstalk is less than 5%, and the crosstalk situation is significantly reduced, far below the design requirements. It should be noted that the number of groups for the plurality of grating units is N, and the maximum offset corresponding to each group of the grating units is N1. The width of the grating units is C. Taking the design crosstalk value as an example, the number of groups N can be determined based on N1/N≤5%*C.

Optionally, the plurality of grating units are divided into a plurality of groups; the plurality of first driving lines are divided into a plurality of groups, a quantity of groups of the first driving lines is equal to a quantity of groups of the grating units, the first driving lines in each of the groups are electrically connected to the grating units in different groups, and a quantity of the first driving lines in each of the groups is equal to a quantity of the ordinal numbers of the first sub-electrodes of the grating units in each of the groups; and the plurality of second driving lines are divided into a plurality of groups, a quantity of groups of the second driving lines is equal to the quantity of the groups of grating units, the second driving lines in each of the groups are electrically connected to the grating units in different groups, and a quantity of the second driving lines in each of the groups is equal to a quantity of the ordinal numbers of the second sub-electrodes of the grating units in each of the groups.

Figure 10:
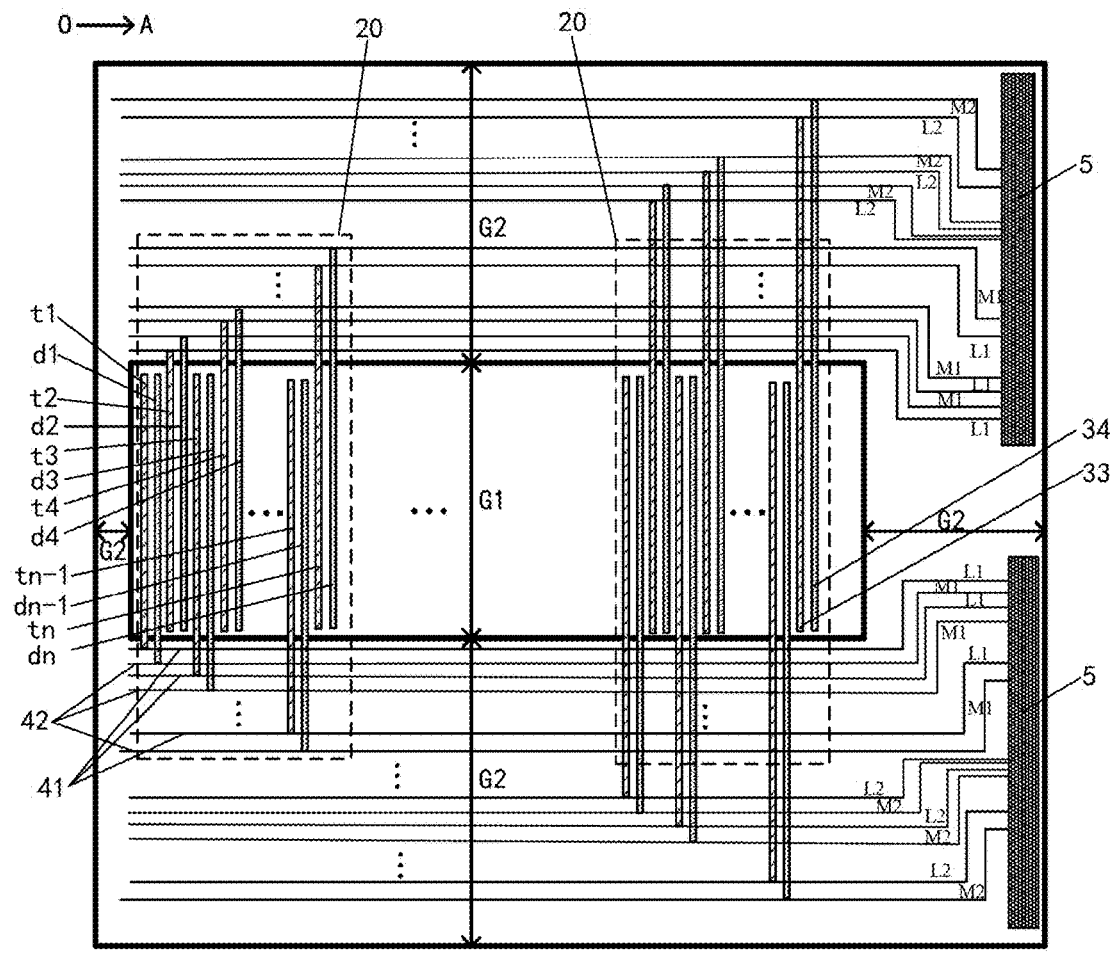
FIG. 10 and FIG. 11 are schematic structural diagrams of another two types of grating adjustment apparatuses according to embodiments of the present application.

Referring to FIG. 10, in the grating units 20 of the first group on the left, the plurality of first sub-electrodes 33 are electrically connected to the first driving lines (marked as L1) in the first group, and the plurality of second sub-electrodes 34 are electrically connected to the second driving lines (marked as M1) in the first group. In the grating unit of the i-th group on the right, the plurality of first sub-electrodes are electrically connected to the first driving lines (marked as L2) in the i-th group, and the plurality of second sub-electrodes are electrically connected to the second driving lines (marked as M2) in the i-th group, where i is a positive integer.

Figure 11:
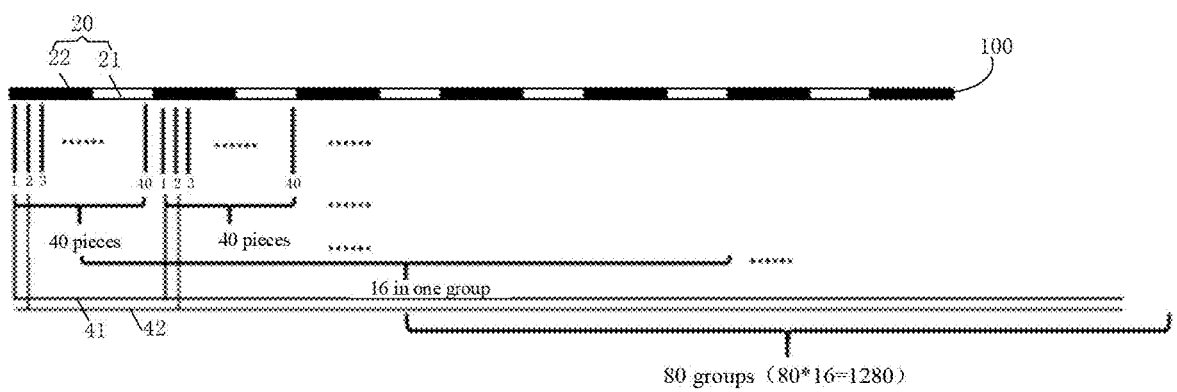

Referring to FIG. 11, the grating adjustment apparatus applied to the 3D display apparatus of 10.95 inch is taken as an example to illustrate. The grating adjustment apparatus may include 1280 grating units, each of the grating units includes 20 first sub-electrodes and 20 second sub-electrodes. The ordinal numbers of the first sub-electrodes and the second sub-electrodes alternately arranged are 1, 2, 3 . . . , 40, respectively. In grating units of the same group, the first sub-electrodes with the same ordinal number are electrically connected to the same first driving line 41, and the second sub-electrodes with the same ordinal number are electrically connected to the same second driving line 42. The 16 consecutively set grating units 20 can form one group, which can be divided into a total of 80 groups, with a total of 8*60=1280 grating units.

In this way, the first sub-electrodes of the grating units in different groups are electrically connected to the first driving lines in different groups, and the second sub-electrodes of the grating units in different groups are electrically connected to the second driving lines in different groups. By controlling the plurality of groups of the grating units through the plurality of first driving lines and the plurality of second driving lines, the opening positions and the opening ratio of the grating units are grouping adjusted, further reducing crosstalk problems.

Optionally, in order to provide driving signals to the first driving lines and the second driving lines, the grating adjustment apparatus further includes at least one drive unit, and the first driving lines in each of the groups and the second driving lines in each of the groups are electrically connected to the at least one drive unit.

There is no restriction on the specific number of the drive units here. For example, it may include one drive unit 5 as shown in FIG. 2*a*, or include two drive units 5 as shown in FIG. 10. The drive unit may include a driver chip (IC) that can be directly connected to the first driving line and second driving line to provide a driving voltage signal. Referring to FIG. 1, the grating adjustment apparatus also includes a Flexible Printed Circuit Board (FPC) 6, and the drive unit 5 may be bound to FPC6.

The first driving lines in each of the groups may be all electrically connected to one drive unit as shown in FIG. 2*a*, or, as shown in FIG. 10, the first driving lines in each of the groups may be divided into two parts: one part is electrically connected to one drive unit, and the other part is electrically connected to another drive unit, without limitation. Similarly, the second driving lines in each of the groups may be all electrically connected to one drive unit as shown in FIG. 2*a*, or the second driving lines in each of the groups may be divided into two parts: one part is electrically connected to one drive unit, and the other part is electrically connected to another drive unit. There is no limitation here.

Optionally, in order to improve driving ability and response speed, referring to FIG. 10, the first driving lines in each of the groups are divided into a first portion (located at a lower part position of the grating unit in FIG. 10) and a second portion (located at an upper part position of the grating unit in FIG. 10), and the first portion and the second portion are electrically connected to different drive units. In FIG. 10, the first driving lines marked as L1 are one group, and the first driving lines marked as L2 are another group, the first portion is electrically connected to the lower drive unit 5, and the second portion is electrically connected to the upper drive unit 5.

Referring to FIG. 10, the second driving lines in each of the groups are divided into a third portion (located at the lower part position of the grating unit in FIG. 10) and a fourth portion (located at the upper part position of the grating unit in FIG. 10), and the third portion and the fourth portion are electrically connected to different drive units 5. In FIG. 10, the second driving lines marked as M1 are one group, and the second driving lines marked as M2 are another group, the third portion is electrically connected to the lower drive unit 5, and the fourth portion is electrically connected to the upper drive unit 5.

Optionally, in order to avoid interference caused by overly dense routing settings, referring to FIG. 10, an orthographic projection of the first portion on the first substrate and an orthographic projection of the second portion on the first substrate are disposed at two opposite sides (the upper side and the lower side in FIG. 10) of an orthographic projection of the first electrode layer on the first substrate; and an orthographic projection of the third portion on the first substrate and an orthographic projection of the fourth portion on the first substrate are disposed at two opposite sides (the upper side and the lower side in FIG. 10) of the orthographic projection of the first electrode layer on the first substrate.

Optionally, in order to fully utilize each driver unit and facilitate design, referring to FIG. 10, the first portion (for example, the first driving lines L1 at the lower part of the grating unit) and the second portion (for example, the first driving lines L1 at the upper part of the grating unit) are mirrored symmetrically, and the third portion (for example, the second driving lines M1 at the lower part of the grating unit) and the fourth portion (for example, the second driving lines M1 at the upper part of the grating unit) are mirrored symmetrically. At this point, the number of the first driving lines included in the first portion is equal to the number of the first driving lines included in the second portion, and the number of the second driving lines included in the third portion is equal to the number of the second driving lines included in the fourth portion.

In order to further reduce mutual interference between adjacent lines, referring to FIG. 10, for the grating units in each of the groups, the first sub-electrodes of which the ordinal numbers are odd numbers (for example: marked as t1, t3, t5, etc.) are electrically connected to the first driving lines of the first portion (for example: the first driving lines L1 at the lower part of the grating unit), and the first sub-electrodes of which the ordinal numbers are even numbers (for example: marked as t2, t4, t6, etc.) are electrically connected to the first driving lines of the second portion (for example: the first driving lines L1 at the upper part of the grating unit).

Referring to FIG. 10, for the grating units in each of the groups, the second sub-electrodes of which the ordinal numbers are odd numbers (for example: marked as d1, d3, d5, etc.) are electrically connected to the second driving lines of the third portion (for example: the second driving lines M1 at the lower part of the grating unit), and the second sub-electrodes of which the ordinal numbers are even numbers (for example: marked as d2, d4, d6, etc.) are electrically connected to the second driving lines of the fourth portion (for example: the second driving lines M1 at the upper part of the grating unit).

In one or more embodiments, referring to FIG. 10, the grating adjustment apparatus further includes a grating area G1, and a non-grating area G2 connected to the grating area G1; and the first electrode layer (including the first sub-electrodes 33) and the second electrode layer (including the second sub-electrodes 34) are disposed in the grating area G1, and the plurality of first driving lines and the plurality of second driving lines are disposed in the non-grating area G2.

Certainly, the first driving lines and the second driving lines may also be disposed in the grating area. However, if the first driving lines and the second driving lines are disposed in the grating area, it is possible to form brightness moire patterns, thus affecting the grating unit. Therefore, it is possible to choose to dispose the first driving lines and the second driving lines in the non-grating area.

In order to reduce wiring settings and simplify the process, one end of each of the first sub-electrodes extends to the non-grating area and is connected to the corresponding first driving line; and one end of each of the second sub-electrodes extends to the non-grating area and is connected to the corresponding second driving line. In this way, the first sub-electrodes and the first driving lines can be electrically connected without the need for additional wirings, and the second sub-electrodes and the second driving lines can be electrically connected, which is simple and easy to achieve.

Optionally, referring to FIG. 10, in each of the grating units, the plurality of first sub-electrodes are sorted in the first direction OA direction (the first sub-electrodes with the ordinal numbers 1, 2, 3 . . . n in FIG. 10 are marked as t1, t2, t3 . . . tn, respectively), the plurality of second sub-electrodes are sorted in the first direction OA direction (the second sub-electrodes with the ordinal numbers 1, 2, 3 . . . n in FIG. 10 are marked as d1, d2, d3 . . . n). Each of the first sub-electrodes and each of the second sub-electrodes include a first end (a lower end of each of the sub-electrodes in FIG.

10) and a second end (an upper end of each of the sub-electrodes in FIG. 10) that are opposite to each other, respectively.

Referring to FIG. 10, in each of the grating units, the first end (the lower end of each of the sub-electrodes in FIG. 10) of each of the first sub-electrodes 33 and the second sub-electrodes 34 of which the ordinal numbers are odd numbers extends to the non-grating area G2, and the second end (the upper end of each of the sub-electrodes in FIG. 10) of each of the first sub-electrodes 33 and the second sub-electrodes 34 of which the ordinal numbers are even numbers extends to the non-grating area G2. Thus, the first sub-electrodes of which the ordinal numbers are odd numbers are electrically connected to the first driving lines of the first portion, the first sub-electrodes of which the ordinal numbers are even numbers are electrically connected to the first driving lines of the second portion. At the same time, the second sub-electrodes of which the ordinal numbers are odd numbers are electrically connected to the second driving lines of the third portion, the second sub-electrodes of which the ordinal numbers are even numbers are electrically connected to the second driving lines of the fourth portion.

In one or more embodiments, in order to improve the amount of the light output of the grating adjustment apparatus, materials of the first sub-electrodes and the second sub-electrodes include transparent conducting materials. For example, the transparent conducting materials may include Indium Tin Oxide (ITO).

In one or more embodiments, referring to FIG. 10, the first sub-electrodes and the second sub-electrodes include a strip electrode. The cross-sectional shape of the strip electrode may include rectangle, square, trapezoid, or inverted trapezoid, and the like.

The embodiment of the present application further provides a 3D display apparatus, referring to FIG. 1, including a display panel 200 and the grating adjustment apparatus 100, and the grating adjustment apparatus 100 and the display panel 200 are disposed oppositely.

The grating adjustment apparatus may be disposed at the light-emitting side of the display panel, and at this point, the grating adjustment apparatus may be referred to as the front grating. Alternatively, as shown in FIG. 1, the grating adjustment apparatus 100 may be disposed at the backlight side of the display panel 200, at this point, the grating adjustment apparatus may be referred to as the rear grating, and there is no limitation here.

The type of the display panel is not limited, and it can be a Twisted Nematic (TN) type, Vertical Alignment (VA) type, In-Plane Switching (IPS) type, Advanced Super Dimension Switch (ADS) type or other types of the liquid crystal display panel, which is not limited here. In addition, if the display panel is the liquid crystal display panel, the 3D display apparatus may also include a backlight module to provide backlight. When the grating adjustment apparatus is disposed at the backlight side of the display panel, the backlight module may be disposed at the backlight side of the grating adjustment apparatus. Certainly, when the grating adjustment apparatus is disposed at the light-emitting side of the display panel, the backlight module may be disposed at the backlight side of the display panel.

The 3D display apparatus can significantly reduce crosstalk during movement, thereby greatly improving user experience and product quality.

Optionally, the display panel includes a touch display panel, as shown in FIG. 1, the grating adjustment apparatus is disposed at the backlight side of the display panel 200. Which can avoid the impact of the grating adjustment apparatus on the touch effect, thereby improving the touch quality.

The touch display panel can adopt touch and display integration (TDDI) touch technology, and there is no limitation to the touch structure here, which can be obtained based on related art.

Optionally, in order to achieve a 3D display effect, referring to FIG. 1, the grating adjustment apparatus includes a grating area G1 and a non-grating area G2 connected to the grating area G1, the display panel 200 includes an active area AA and a non-active area BB connected to the active area AA; and the active area AA covers the grating area G1, and the non-active area BB covers the non-grating area G2.

The active area of the above display panel is used to set pixels for display, and the non-active area is used to set driving circuits, etc.

Optionally, in order to simplify the process, referring to FIG. 1, the grating adjustment apparatus 100 includes a first substrate 1 and a second substrate 2 that are opposite to each other, the display panel 200 includes a third substrate 9 and a fourth substrate 10 that are opposite to each other, and the second substrate 2 is adhered to the third substrate, for example, the double-sided tape 13 shown in FIG. 1 may be used for adhering. In addition, in order to avoid the influence of external stray light, referring to FIG. 1, an outer side of the first substrate 1 of the grating adjustment apparatus 100 may also be provided with a first polarizing layer 16. If the display panel is the liquid crystal display panel, referring to FIG. 1, the display panel may also include a second polarizing layer 11 and a third polarizing layer 12, wherein the second polarizing layer 11 is disposed at a side of the third substrate 9 close to the second substrate 2, and the third polarizing layer 12 is disposed at a side of the fourth substrate 10 away from the third substrate 9.

Certainly, as shown in FIG. 1, the above display panel MAY also include structures such as a color film layer 17, a first sealing glue 15, a driver chip 7, and a circuit board 8. The grating adjustment apparatus may also include structures such as a second sealing glue 14 and the insulation layer 30. Here, only the content related to the invention point is introduced, and other structures can be obtained by referring to related art.

Optionally, in order to track the movement of the human eye in real-time, the 3D display apparatus further includes a shooting unit, the grating adjustment apparatus is electrically connected to the shooting unit, and is configured to adjust opening positions and/or opening ratios of the grating units of the grating adjustment apparatus according to shooting information of the shooting unit.

The shooting unit may include a camera, and the grating adjustment apparatus can analyze information such as a human-eye position based on the shooting information of the shooting unit and relevant eye tracking technology, and adjust the opening positions and/or opening rate of the grating units in real-time to match the position of the moved viewpoint as much as possible, thereby reducing crosstalk phenomenon during the movement process, improving user experience and product quality.

The above is only the specific implementation method of the present application, but the scope of protection of the present application is not limited to this. Any technical personnel familiar with this technical field who can easily think of changes or replacements within the scope of technology disclosed in the present application should be covered within the scope of protection of the present application. Therefore, the protection scope of the present application should be based on the protection scope of the claims.

The invention claimed is:

1. A grating adjustment apparatus, applied to a 3D display apparatus, wherein the grating adjustment apparatus comprises a first electrode layer, a second electrode layer and a first substrate and a second substrate that are opposite to each other, the first electrode layer is disposed at a side of the first substrate close to the second substrate, and the second electrode layer is disposed at a side of the second substrate close to the first substrate;

the first electrode layer comprises a first sub-electrode layer and a second sub-electrode layer that are arranged in stacked, the first sub-electrode layer comprises a plurality of first sub-electrodes arranged in a first direction, the second sub-electrode layer comprises a plurality of second sub-electrodes arranged in the first direction, orthographic projections of the first sub-electrodes on the first substrate and orthographic projections of the second sub-electrodes on the first substrate are alternately arranged;

the grating adjustment apparatus further comprises a plurality of first driving lines, a plurality of second driving lines and a plurality of grating units arranged in the first direction; each of the grating units comprises the plurality of first sub-electrodes and the plurality of second sub-electrodes, and is configured as: when the grating adjustment apparatus is powered on, the grating unit is capable of forming a light transmission unit and a shading unit, and opening positions and/or opening ratios of the grating unit are adjustable; and for the grating units in the same group, at least two of the first sub-electrodes are electrically connected to different first driving lines, and at least two of the second sub-electrodes are electrically connected to different second driving lines;

wherein for the grating units in the same group, the first sub-electrodes are all electrically connected to different first driving lines, and the second sub-electrodes are all electrically connected to different second driving lines;

wherein in each of the grating units, the plurality of first sub-electrodes are sorted in the first direction, and the plurality of second sub-electrodes are sorted in the first direction;

for the grating units in the same group, the first sub-electrodes of a same ordinal number are electrically connected to the same first driving line, and the second sub-electrodes of a same ordinal number are electrically connected to the same second driving line;

wherein the plurality of grating units are divided into a plurality of groups;

the plurality of first driving lines are divided into a plurality of groups, a quantity of groups of the first driving lines is equal to a quantity of groups of the grating units, the first driving lines in each of the groups are electrically connected to the grating units in different groups; and the plurality of second driving lines are divided into a plurality of groups, a quantity of groups of the second driving lines is equal to the quantity of the groups of grating units, the second driving lines in each of the groups are electrically connected to the grating units in different groups.

2. The grating adjustment apparatus according to claim 1, wherein a quantity of the first driving lines in each of the groups is equal to a quantity of the ordinal numbers of the first sub-electrodes of the grating units in each of the groups; and a quantity of the second driving lines in each of the groups is equal to a quantity of the ordinal numbers of the second sub-electrodes of the grating units in each of the groups.

3. The grating adjustment apparatus according to claim 1, wherein the grating adjustment apparatus further comprises at least one drive unit, and the first driving lines in each of the groups and the second driving lines in each of the groups are electrically connected to the at least one drive unit.

4. The grating adjustment apparatus according to claim 3, wherein the first driving lines in each of the groups are divided into a first portion and a second portion, and the first portion and the second portion are electrically connected to different drive units; and the second driving lines in each of the groups are divided into a third portion and a fourth portion, and the third portion and the fourth portion are electrically connected to different drive units.

5. The grating adjustment apparatus according to claim 4, wherein an orthographic projection of the first portion on the first substrate and an orthographic projection of the second portion on the first substrate are disposed at two opposite sides of an orthographic projection of the first electrode layer on the first substrate; and an orthographic projection of the third portion on the first substrate and an orthographic projection of the fourth portion on the first substrate are disposed at two opposite sides of the orthographic projection of the first electrode layer on the first substrate.

6. The grating adjustment apparatus according to claim 5, wherein the first portion and the second portion are mirrored symmetrically, and the third portion and the fourth portion are mirrored symmetrically.

7. The grating adjustment apparatus according to claim 5, wherein for the grating units in each of the groups, the first sub-electrodes of which the ordinal numbers are odd numbers are electrically connected to the first driving lines of the first portion, and the first sub-electrodes of which the ordinal numbers are even numbers are electrically connected to the first driving lines of the second portion; and for the grating units in each of the groups, the second sub-electrodes of which the ordinal numbers are odd numbers are electrically connected to the second driving lines of the third portion, and the second sub-electrodes of which the ordinal numbers are even numbers are electrically connected to the second driving lines of the fourth portion.

8. The grating adjustment apparatus according to claim 1, wherein the grating adjustment apparatus further comprises a grating area, and a non-grating area connected to the grating area; and the first electrode layer and the second electrode layer are disposed in the grating area, and the plurality of first driving lines and the plurality of second driving lines are disposed in the non-grating area.

9. The grating adjustment apparatus according to claim 8, wherein one end of each of the first sub-electrodes extends to the non-grating area and is connected to the corresponding first driving line; and one end of each of the second sub-electrodes extends to the non-grating area and is connected to the corresponding second driving line.

10. The grating adjustment apparatus according to claim 9, wherein in each of the grating units, the plurality of first sub-electrodes are sorted in the first direction, the plurality of second sub-electrodes are sorted in the first direction, and each of the first sub-electrodes and each of the second sub-electrodes comprise a first end and a second end that are opposite to each other, respectively; and in each of the grating units, the first end of each of the first sub-electrodes and the second sub-electrodes of which the ordinal numbers are odd numbers extends to the non-grating area, and the second end of each of the first sub-electrodes and the second sub-electrodes of which the ordinal numbers are even numbers extends to the non-grating area.

11. The grating adjustment apparatus according to claim 1, wherein materials of the first sub-electrodes and the second sub-electrodes comprise transparent conducting materials.

12. The grating adjustment apparatus according to claim 1, wherein the first sub-electrodes and the second sub-electrodes comprise a strip electrode.

13. A 3D display apparatus, wherein the 3D display apparatus comprises a display panel and the grating adjustment apparatus according to claim 1, and the grating adjustment apparatus and the display panel are disposed oppositely.

14. The 3D display apparatus according to claim 13, wherein the display panel comprises a touch display panel, and the grating adjustment apparatus is disposed at a backlight side of the display panel.

15. The 3D display apparatus according to claim 14, wherein the grating adjustment apparatus comprises a grating area and a non-grating area connected to the grating area, the display panel comprises an active area and a non-active area connected to the active area; and the active area covers the grating area, and the non-active area covers the non-grating area.

16. The 3D display apparatus according to claim 15, wherein the grating adjustment apparatus comprises a first substrate and a second substrate that are opposite to each other, the display panel comprises a third substrate and a fourth substrate that are opposite to each other, and the second substrate is adhered to the third substrate.

17. The 3D display apparatus according to claim 13, wherein the 3D display apparatus further comprises a shooting unit, the grating adjustment apparatus is electrically connected to the shooting unit, and is configured to adjust opening positions and/or opening ratios of the grating units of the grating adjustment apparatus according to shooting information of the shooting unit.

\* \* \* \* \*